Dec. 23, 1969  E. H. COCKS  3,485,417
HAND-HELD APPLICATOR FOR HOT-MELT ADHESIVES
Filed June 19, 1968
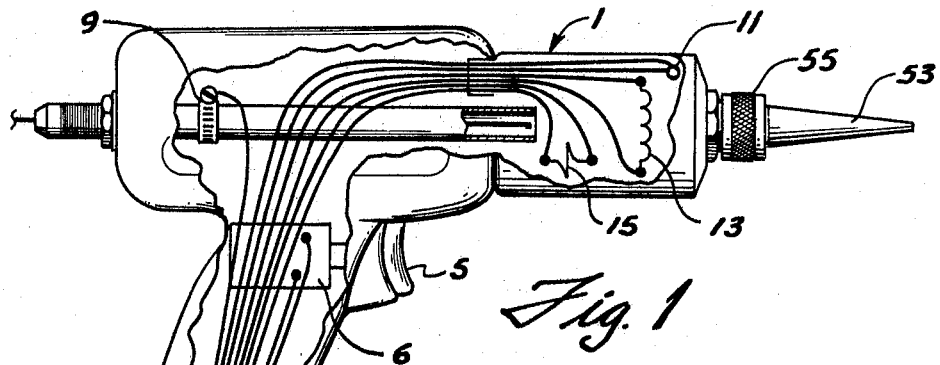
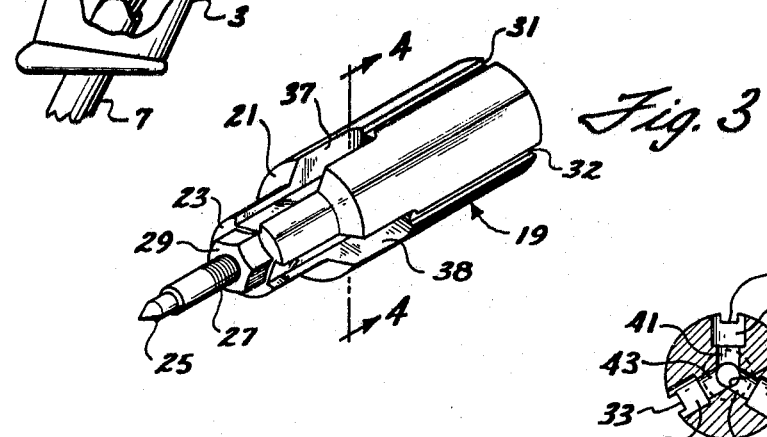
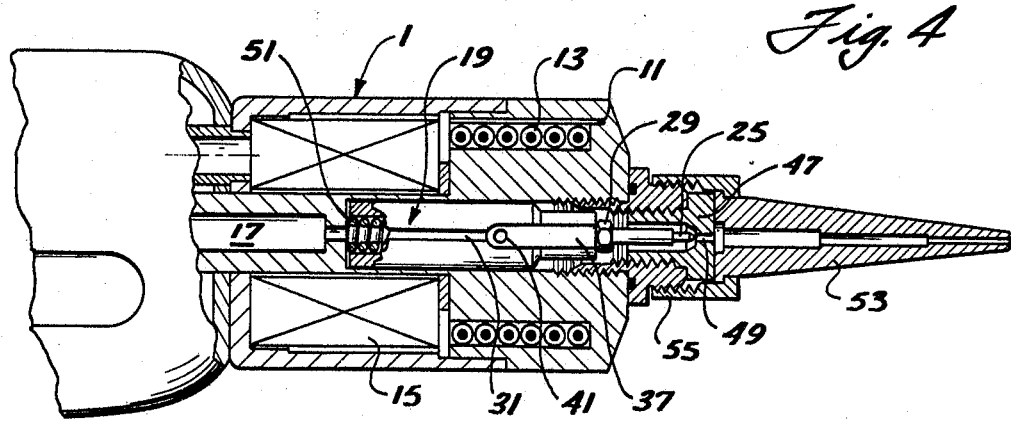
INVENTOR
ERIC H. COCKS
BY *L.J. Crickenberger*
ATTORNEY

United States Patent Office

3,485,417
Patented Dec. 23, 1969

3,485,417
HAND-HELD APPLICATOR FOR HOT-MELT ADHESIVES
Eric H. Cocks, 21 Crane Ave.,
West Caldwell, N.J. 07006
Filed June 19, 1968, Ser. No. 738,174
Int. Cl. F16k *31/62*
U.S. Cl. 222—146                                2 Claims

ABSTRACT OF THE DISCLOSURE

A trigger-operated hand-held applicator for hot-melt adhesives comprising an airless, solenoid-operated, pistol-shaped device with adjustable valve tip, fast-acting valve plunger and pointed nozzle for precise applications in an adhesive applying system with automatic heating.

BACKGROUND OF THE INVENTION

Hot melt adhesives are adhesives which normally exist in solid form at room temperature. In appearance they are generally similar to waxes with certain additives and formulations. Heated to a temperature between 200° F. and 500° F. these adhesives liquify and may be dispensed and applied by appropriate equipment. Typical applications of such adhesives are found in the packaging industry where it is necessary to lay down lines of adhesive materials in the process of assemblying boxes and other cartons.

It is frequently desirable to form the heated adhesives in short sections of lines, or even dots. Since the hot melt adhesives are usually very viscous in nature, any precisely controlled application presents a problem. Even when the plunger or valve mechanism utilized in the dispenser opens and closes properly, the heated adhesive will be sluggish in leaving the nozzle unless there is a high pressure in the system. This may produce a dripping or drag of adhesive and defeat the requirements of precise application. When high pressure is utilized in the system so that the adhesive leaves the dispenser promptly, there will still be occasions where the initial release of pressure will cause a greater thickness of adhesive at the beginning point of application. In some cases, such as applying a hot adhesive to polyethylene, a greater thickness of adhesive can be objectionable since this greater mass retains more heat. If adhesive temperature is close to the melting point of the plastic, the heat of the adhesive may then cause the plastic to soften and to adhere to itself.

Hot-melt adhesives are commonly dispensed at control stations from applicators or guns which are fixedly mounted. At times, however, it is desirable to apply such adhesives by hand operation in applications where the adhesives must be dispensed with precision. The normally available stationary applicators are not suitable for such purposes because of their awkward physical construction and the slow action in dispensing and cutting off the supply of melted adhesive.

SUMMARY

A feature of the present invention is the provision of an applicator of convenient physical shape to be manipulated by hand with flexiblity while maintaining good visibility with respect to the work being performed. Another feature of the present invention is a provision of a fast-acting applicator which can handle high viscosity adhesives with precision and accuracy.

These features are realized in a pistol-shaped device having a hollow body with an internal fluid passageway. The passageway contains a solenoid-operated valve plunger with a central bore and longitudinally extending circumferential slots communicating therewith to provide joint and alternate paths for the fluid around and through the plunger to facilitate fast plunger action when operating with viscous fluids. An adjustable tip is threadedly mounted in the plunger to cooperate with valve seat means to open and close the passageway. A nozzle member with a conical tip having a half-cone angle of 15° or less is provided to give full visibility to the work area adjacent the tip. The solenoid action is controlled by the operation of a trigger switch, and operating consistency of the viscous fluid within the device is maintained by a heating coil operated by a thermistor-sensor element.

BRIEF DESCRIPTION OF THE DRAWING

FIG. 1 is a partially broken-away perspective view showing diagrammatically the electrical connections employed in the applicator of the present invention;

FIG. 2 is a cross-sectional view of the front end of the applicator shown in FIG. 1;

FIG. 3 is a perspective view of the valve plunger employed in the present invention; and FIG. 4 is a cross-sectional view taken along line 4—4 of FIG. 3.

DESCRIPTION OF THE PREFERRED EMBODIMENT

The invention will be understood more readily by referring to the drawings in which FIG. 1 is a perspective view showing the general electrical operation of the device. The applicator indicated generally by the numeral 1 is of a conventional pistol shape having a handle 3 and trigger 5. An electrical cable 7 carries four pairs of wires and an additional ground wire which is secured to clamp 9 within the body of gun 1.

One pair of wires is connected to a thermister-sensor element 11 which senses the temperature within the gun 1 and activates an electrical heater coil 13 through appropriate control circuitry (not shown). Heat is supplied to the adhesive within the gun by means of heater 13 under control of thermister-sensor element 11 such that operating consistency of the adhesive is maintained for immediate operation of the gun at all times the gun is in use.

Another pair of wires is connected to a solenoid coil 15 which operates the valve plunger within the gun 1. The wires to solenoid coil 15 are energized by actuating trigger member 5, thereby signalling the control circuitry through trigger switch 6 to energize solenoid 15.

The interior physical structure of the gun 1 is seen from the cross-sectional view of FIG. 2. An axial passageway 17 extends throughout the gun, and disposed in an enlarged portion thereof is valve plunger 19. Valve plunger 19 is made up of a body having a portion 21 of diameter closely approximating the size of axial passageway 17 in which it is disposed, and a portion 23 of reduced diameter. A replaceable tip 25 is fastened in the end of plunger 19 by means of screw threads 27, and is locked in place by means of nut 29, thereby allowing for longitudinal adjustment and replacement of the tip. Plunger 19 has three evenly-spaced longitudinal slots 31, 32, and 33 of shallow depth disposed around its outer circumference. Each of these three shallow slots opens into a wider and deeper slot which communicates with a central longitudinal bore 35. The three deeper slots are shown at 37, 38 and 39, respectively. The slots 37, 38 and 39 communicate with the central longitudinal bore 35 by means of radial bores 41, 42 and 43, respectively. This structure allows both joint and alternate paths for the fluid around and through the plunger to facilitate rapid operation of the plunger when viscous fluids are employed.

The fluid passageway 17 terminates in valve seat means 47 having an orifice 49 closed by valve tip 25. Valve tip 25 is normally biased against valve seat means 47 by means of biasing spring 51 disposed in central bore 35.

Nozzle member 53 is conical in configuration, and has a half-cone angle of 15° or less to render the work area adjacent the tip fully visible to an operator. Nozzle 53 is secured to the gun 1 by means of a conventional internally threaded sleeve 55.

In operation the valve plunger and tip are spring-biased against the valve seat in a normally closed position. Actuation of the trigger member operates the trigger switch to energize the solenoid and cause the valve plunger to be drawn away from the valve seat to open the passageway. The material being dispensed can travel through the central bore as well as down the circumferential slots, thereby permitting rapid dispensing of relatively viscous materials. Both the operational movement of the plunger and the flow of adhesive is accelerated by the automatic heating system which provides a heating coil within the gun operated by a thermister-sensor element to maintain operational viscosity whenever the gun is in use. The replaceable and adjustable tip structure extends the effective usefulness of the gun by enabling the user to select a desired tip and adjust its length of travel in accordance with the viscosity of the material being dispensed. Full view of the work area is made possible by the small angle of the conical tip thereby allowing precise hand-held applications to be accomplished.

While the invention has been shown and described with particular reference to a preferred embodiment, it will be understood by those skilled in the art that various changes in form and details may be made without departing from the spirit and scope of the invention.

What is claimed is:

1. A hand-held applicator for the airless dispensing of hot-melt adhesives comprising
    a pistol-shaped hollow body,
    an internal fluid passageway within said hollow body,
    nozzle means coupled to one end of said fluid passageway,
        said nozzle means having an elongated conical tip, the half-cone angle of which is 15° or less,
    valve seat means within said passageway,
    a valve plunger in said passageway to close said passageway in cooperation with said valve seat means,
        said valve plunger comprising a cylindrical body member having a plurality of longitudinally extending slots spaced around the circumference of said plunger.
    a central bore in said plunger communicating with each of said slots,
        whereby adhesive material may travel through said internal fluid passageway both through said plunger by means of said central bore and around said plunger in said longitudinally extending slots,
    a valve tip member threadedly mounted in said valve plunger to cooperate with said valve seat means as said plunger moves to open and close said internal passageway,
        locking means for securing said tip member in adjusted relationship,
    solenoid coil means mounted concentrically around said valve plunger to move said valve tip member in and out of engagement with said valve seat means, and
    trigger switch means mounted on said pistol-shaped hollow body for energizing said solenoid coil means,
    whereby said applicator may be held in the hand of an operator in pistol-grip fashion with the work area adjacent said conical tip being fully visible.

2. The combination according to claim 1 comprising
    heater means within said hollow body for maintaining said hot-melt adhesives at a predetermined operating temperature, and
    sensing means within said hollow body for sensing the ambient temperature for control purposes.

References Cited

UNITED STATES PATENTS

| | | | |
|---|---|---|---|
| 2,567,960 | 9/1951 | Meyers et al. | 222—146 X |
| 3,314,574 | 2/1967 | Longval et al. | 222—146 |
| 3,387,692 | 6/1968 | Levake | 222—504 X |

SAMUEL F. COLEMAN, Primary Examiner

H. S. LANE, Assistant Examiner

U.S. Cl. X.R.

222—504; 251—139